US 12,423,383 B2

(12) United States Patent
Devi et al.

(10) Patent No.: US 12,423,383 B2
(45) Date of Patent: Sep. 23, 2025

(54) METHOD FOR EXPLORATION BASED ON CURIOSITY AND PRIORITIZATION OF EXPERIENCE DATA IN MULTI-AGENT REINFORCEMENT LEARNING

(71) Applicant: Electronics and Telecommunications Research Institute, Daejeon (KR)

(72) Inventors: Ningombam Devarani Devi, Daejeon (KR); Sungwon Yi, Daejeon (KR); Hyun Woo Kim, Daejeon (KR); Hwa Jeon Song, Daejeon (KR); Byung Hyun Yoo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 932 days.

(21) Appl. No.: 17/570,226

(22) Filed: Jan. 6, 2022

(65) Prior Publication Data
US 2022/0215204 A1    Jul. 7, 2022

(30) Foreign Application Priority Data

Jan. 6, 2021  (KR) .................. 10-2021-0001498
Dec. 28, 2021 (KR) .................. 10-2021-0190049

(51) Int. Cl.
| | |
|---|---|
| G06F 18/231 | (2023.01) |
| G06F 18/21 | (2023.01) |
| G06F 18/22 | (2023.01) |
| G06F 18/2413 | (2023.01) |

(52) U.S. Cl.
CPC .......... *G06F 18/231* (2023.01); *G06F 18/217* (2023.01); *G06F 18/22* (2023.01); *G06F 18/24133* (2023.01)

(58) Field of Classification Search
CPC ........ G06N 3/02; G06N 20/00; G06F 18/231; G06F 18/217; G06F 18/22; G06F 18/24133; G06F 18/254; G06F 18/23
See application file for complete search history.

(56) References Cited

U.S. PATENT DOCUMENTS

| | | | |
|---|---|---|---|
| 11,113,605 B2* | 9/2021 | Czarnecki | G06N 3/006 |
| 11,562,829 B2* | 1/2023 | Wei | G06N 3/08 |

(Continued)

FOREIGN PATENT DOCUMENTS

KR    1020200116344 A    10/2020

OTHER PUBLICATIONS

Influence-based multi-agent exploration, T Wang, J Wang, Y Wu, C Zhang, arXiv: 1910.05512v1, Oct. 12, 2019, 20 pages. (Year: 2019).*

(Continued)

*Primary Examiner* — Barbara M Level
(74) *Attorney, Agent, or Firm* — WILLIAM PARK AND ASSOCIATES LTD.

(57) ABSTRACT

Provided is a method for exploration based on curiosity and prioritization of experience data in multi-agent reinforcement learning, the method including the steps of: calculating a similarity between a policy of a first agent and a policy of a second agent and computing a final reward using the similarity; and performing clustering on a replay buffer (Continued)

using a result of calculating the similarity between the policy of the first agent and the policy of the second agent and performing sampling on data in the cluster.

12 Claims, 6 Drawing Sheets

(56) References Cited

U.S. PATENT DOCUMENTS

| | | | | |
|---|---|---|---|---|
| 11,627,165 | B2* | 4/2023 | Silver | G06F 18/214 726/1 |
| 12,001,320 | B2* | 6/2024 | Liu | G06F 11/3684 |
| 2007/0136219 | A1 | 6/2007 | Kim et al. | |
| 2019/0266489 | A1* | 8/2019 | Hu | B60W 10/20 |
| 2020/0160168 | A1* | 5/2020 | Yang | G06N 3/006 |
| 2020/0179808 | A1 | 6/2020 | Lee et al. | |
| 2020/0265305 | A1* | 8/2020 | Budden | G06N 3/006 |
| 2020/0372366 | A1* | 11/2020 | Badia | G06N 3/088 |
| 2023/0214725 | A1* | 7/2023 | Hu | G06N 3/092 706/12 |
| 2025/0078672 | A1* | 3/2025 | Aldhyani | G06Q 50/205 |

OTHER PUBLICATIONS

Narvekar, Sanmit, Bei Peng, Matteo Leonetti, Jivko Sinapov, Matthew E. Taylor, and Peter Stone. "Curriculum learning for reinforcement learning domains: A framework and survey." Journal of Machine Learning Research 21 (2020), arXiv:2003.04960v2 [cs.LG] pp. 1-50. (Year: 2020).*

Weixun Wang, Tianpei Yang, Yong Liu, Jianye Hao, Xiaotian Hao, Yujing Hu, Yingfeng Chen, Changjie Fan, and Yang Gao, "From few to more: Large-scale dynamic multiagent curriculum learning", In Association for the Advancement of Artificial Intelligence (AAAI), pp. 7293-7300, 2020. (Year: 2020).*

Jiachen Yang, Alireza Nakhaei, David Isele, Kikuo Fujimura, and Hongyuan Zha, "CM3: Cooperative multi-goal multi-stage multi-agent reinforcement learning", In International Conference on Learning Representations (ICLR), 24 pages, 2020. (Year: 2020).*

NeurIPS-2021-episodic-multi-agent-reinforcement-learning-with-curiosity-driven-exploration-Paper, Zheng et al. Dec. 14, 2020, 13 pages. (Year: 2020).*

Tom Schaul et al., Prioritized Experience Replay, Arxiv.org/abs/1511.05952, Feb. 15, 2016.

Yali Du et al., LIIR: Learning Individual Intrinsic Reward in Multi-Agent Reinforcement Learning, Advances in Neural Information Processing Systems 32, 33rd Conference on Neural Information Processing Systems (NeurIPS 2019), Vancouver, Canada, pp. 4403-4414, 2019.

Mirza Ramicic et al., Correlation minimizing replay memory in temporal-difference reinforcement learning, Neurocomputing 393 (2020), Accepted Feb. 5, 2020, Available online Feb. 6, 2020, p. 91-100, Elsevier.

Sanmit Narvekar et al., Curriculum Learning for Reinforcement Learning Domains: A Framework and Survey, Journal of Machine Learning Research 21 (2020), Published Jul. 2020, 1-50 pages.

Tonghan Wang et al., Influence-Based Multi-Agent Exploration, arXiv:1910.05512v1 [cs.LG], Oct. 12, 2019, pp. 1-20, Institute for Interdisciplinary Information Sciences, Tsinghua University, Beijing China.

* cited by examiner

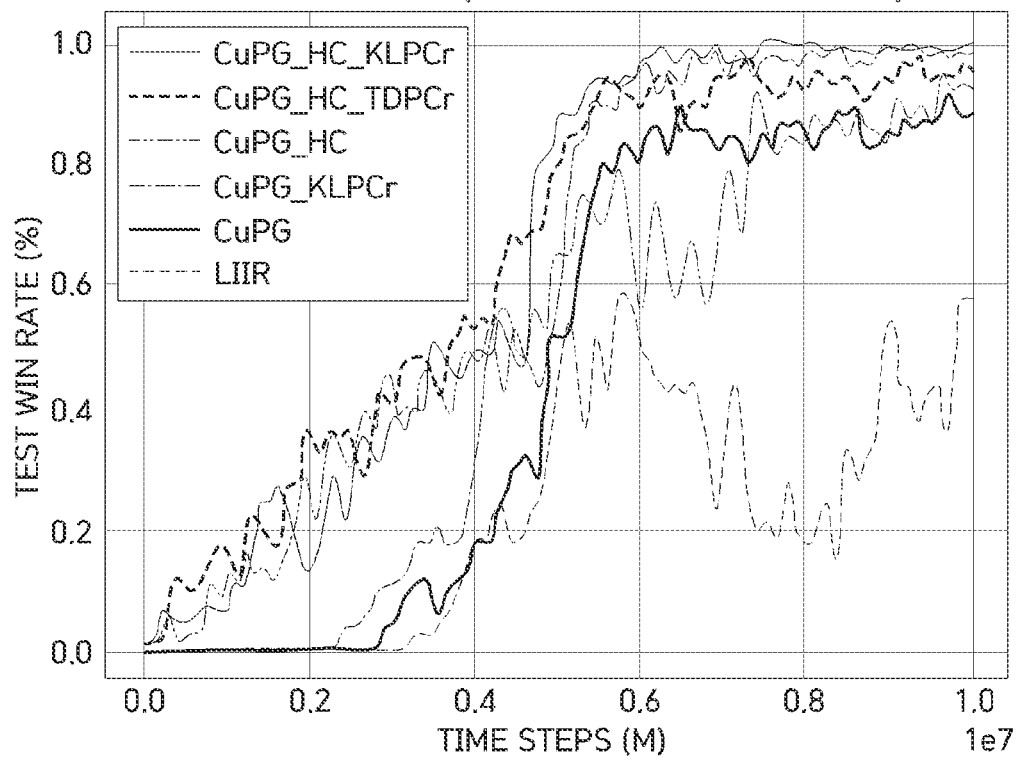

METHOD FOR EXPLORATION BASED ON CURIOSITY AND PRIORITIZATION OF EXPERIENCE DATA IN MULTI-AGENT REINFORCEMENT LEARNING

CROSS-REFERENCE TO RELATED APPLICATION

This application claims priority to and the benefit of Korean Patent Application No. 10-2021-0001498, filed on Jan. 6, 2021, and Korean Patent Application No. 10-2021-0190049, filed on Dec. 28, 2021, the disclosure of which is incorporated herein by reference in its entirety.

BACKGROUND

1. Field of the Invention

The present invention relates to a method for exploration based on curiosity and prioritization of experience data in multi-agent reinforcement learning.

2. Discussion of Related Art

Multi-agent reinforcement learning according to the related art calculates the influence of actions of other agents relying only on neural networks and is incapable of reflecting the optimal policy according to the actions of the other agent in the learning.

In addition, as the size of a replay buffer (a memory) increases, since multi-agent reinforcement learning according to the related art selects only a small number of samples, agents may not make various attempts and find only a limited approach when solving complex problems.

SUMMARY OF THE INVENTION

The present invention has been proposed to solve the above-described problem and is directed to providing a method in which the first agent learns the policy thereof (of the first agent) in consideration of the policy of the second agent (that is, another agent including a plurality of agents) and extracts experience data in a replay buffer (a memory) on the basis of the learning in multi-agent reinforcement learning with sparse rewards.

The technical objectives of the present invention are not limited to the above, and other objectives may become apparent to those of ordinary skill in the art based on the following description.

According to an aspect of the present invention, there is provided a method for exploration based on curiosity and prioritization of experience data in multi-agent reinforcement learning, the method including the steps of: (a) calculating a similarity between a policy of a first agent and a policy of a second agent and computing a final reward using the similarity; and (b) performing clustering on a replay buffer using a result of calculating the similarity between the policy of the first agent and the policy of the second agent and performing sampling on data in the cluster.

The step (a) may include calculating the similarity between the policies using conditional mutual information.

The step (a) may include summing a product of a reward according to an influence of another agent and a parameter learned by a neural network and a reward given in common from an environment to compute the final reward.

The step (a) may include additionally using an intrinsic reward to compute the final reward.

The step (b) may include performing an action according to the policy of the first agent and monitoring a preset number of recent histories among histories of the second agent to calculate the similarity of the policies.

The step (b) may include using Kullback-Leibler (KL) divergence to calculate the similarity of the policies.

The step (b) may include storing a value of the calculated KL divergence in the replay buffer and performing the clustering such that a total number of the clusters become less than a preset number using hierarchical agglomerative clustering.

The step (b) may include performing the sampling according to at least one of a criterion using a number of all pieces of data and a number of pieces of data in the cluster and a criterion using a sum of the KL divergence values of the replay buffer and the KL divergence values in the cluster.

According to an aspect of the present invention, there is provided an apparatus for curiosity-based exploration and prioritization of experience data in multi-agent reinforcement learning, the apparatus including: an input unit configured to receive a policy of a first agent and a policy of a second agent; a memory in which a program for comparing a similarity of the policies to compute a final reward and determining a priority of experience data is stored; and a processor configured to execute the program, wherein the processor computes the final reward obtained by summing a reward according to an influence of the second agent and a reward given in common from an environment on the basis of the similarity between the policies.

The processor may calculate the similarity between the policies through conditional mutual information and compute the final reward.

The processor may calculate the similarity between the policies using an action according to the policy of the first agent and a result of monitoring histories of the second agent.

The processor may perform clustering on a replay buffer using a result of calculating the similarity between the policies and performs sampling on data in the cluster to determine a priority of experience data.

The processor may perform the clustering such that a total number of the clusters become less than a preset number using hierarchical agglomerative clustering.

The processor may perform the sampling according to at least one of a criterion using a number of all pieces of data and a number of pieces of data in the cluster and a criterion using a sum of KL divergence values of the replay buffer and KL divergence values in the cluster.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 3A through FIG. 3C illustrate test results according to the related art and an embodiment of the present invention.

DETAILED DESCRIPTION OF EXEMPLARY EMBODIMENTS

Figure 1:
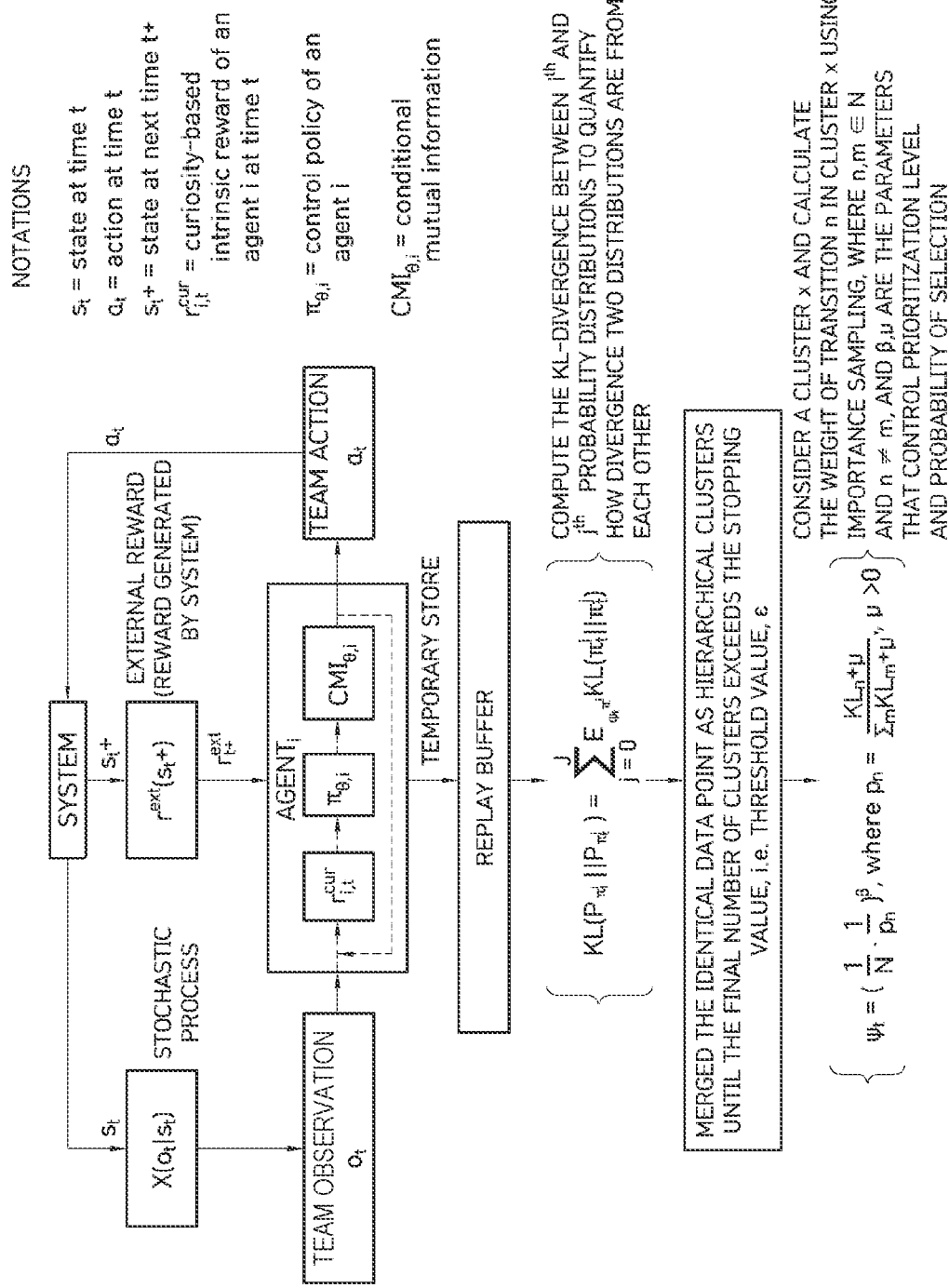
FIGS. 1 and 2 illustrate an operation of a method for exploration based on curiosity and prioritization of experience data in multi-agent reinforcement learning according to an embodiment of the present invention.

Hereinafter, the above and other objectives, advantages, and features of the present invention and ways of achieving them will become readily apparent with reference to descriptions of the following detailed embodiments in conjunction with the accompanying drawings.

However, the present invention is not limited to embodiments to be described below and may be embodied in various forms. The embodiments to be described below are provided only to assist those skilled in the art in fully understanding the objectives, configurations, and the effects of the invention, and the scope of the present invention is defined only by the appended claims.

Meanwhile, terms used herein are used to aid in the explanation and understanding of the embodiments and are not intended to limit the scope and spirit of the present invention. It should be understood that the singular forms "a" and "an" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof.

Before describing the embodiments of the present invention, the background for proposing the present invention will be described first for the sake of understanding for those skilled in the art.

Reinforcement learning (RL) is a method of learning to allow a certain task to be performed through continuous rewards in the field of artificial intelligence technology. RL, which operates so that one agent learns an action or a sequence of actions that maximizes the reward thereof in a given environment, has been variously studied since the advent of deep learning.

RL may be divided into single-agent RL and multi-agent RL according to the number of agents. In light of characteristics of various fields, such as robots, vehicles, and battlefields, to which RL is applied in practice, it is important to consider multiple agents. In single-agent RL, the agent operates only by interacting with an environment. On the other hand, in multi-agent RL, one agent needs to interact with multiple other agents and an environment.

RL technology according to the related art focuses on calculating the probability of joint actions and performing efficient exploration. However, according to the related art, each agent is given the same reward from the environment, regardless of whether the agent has contributed to the result in practice. Therefore, there is no method of providing each agent with a reward according to the contribution to the result. In multi-agent RL, a reward plays a key role in learning, but due to a combination of vast learning areas and actions of each agent, each state/action is very rarely given a reward.

In order to solve the limitations, the related art has introduced the concept of an intrinsic reward of agents, called a learning individual intrinsic reward (LIIR). That is, the influence (contribution) of each agent on the result is added in the form of an intrinsic reward. The intrinsic reward refers to a reward individually given to each agent, unlike the extrinsic reward, which is given to all agents in common from the environment. According to the related art, the intrinsic reward of an agent is calculated, and the total reward is calculated by the agent as the sum of the extrinsic reward obtained from the environment and the individually generated intrinsic reward. In this case, the weight between the two rewards needs to be set separately. The LIIR algorithm performs bi-level optimization, first finds a parameter of a policy that maximizes the sum of the extrinsic and intrinsic rewards, and then, based on the obtained policy parameters, optimizes a parameter of an artificial neural network for individual reward that maximizes only the extrinsic reward. Since each agent is individually given a reward in the form of an intrinsic reward, a policy with a high-performance may be found and policies with various patterns may be found.

The approach is known to operate efficiently in a multi-agent RL environment in which rewards are very sparsely given but has limitations in calculating the actions of other agents and the influence therefrom relying only on neural networks and not reflecting the optimal policy according to the actions of other agents in learning.

In addition to the above limitations, the multi-agent RL according to the related art has a limitation related to sampling state transition data in a replay buffer (a memory).

The replay buffer is a configuration to solve a limitation of rapid change in learning and slow convergence due to the correlation of sample data used in RL. That is, state transition data generated during execution is not immediately used for learning but is temporarily stored and used to reduce the correlation between data. In this case, the state transition data in the buffer is extracted through random sampling, but the method has a slow convergence speed due to the large amount of data.

A method of assigning a weight to each state transition was proposed so that the probability of using a sample with a high weight is increased to improve the convergence speed, and a temporal difference (TD) error used herein adopts a method of increasing the convergence speed by selecting a sample with the largest difference between the reward and the value of the next state in the current state. However, the method has a limitation in that as the size of the replay buffer increases, only a small number of samples are selected, which prevents the agent from making various attempts. Therefore, there is a limit to finding only a limited approach when solving complex problems, such as StarCraft.

The present invention has been proposed to solve the above-described limitations and proposes a method of learning the policy of a first agent (self) in consideration of the action (policy) of a second agent (another agent) and selecting data to be sampled from a replay buffer in consideration of the policy of the other agent so that various cases are explored and an effective solution is found.

Multi-agent RL according to the related art has a significantly large action space and thus mistakenly recognizes all situations changed by actions of other agents as being derived from the environment.

According to an embodiment of the present invention, departing from learning an action that appears to give the maximum reward in a greedy-manner, an agent performs learning based on an action of another agent of which the policy gives an influence on the agent, thereby providing an effect of efficiently solving complex problems.

In addition, according to an embodiment of the present invention, even in using past experience, an agent performs learning on samples that influences the agent by a policy of another agent, and performs learning on a rare case using clustering, thereby providing an effect of performing various types of learning.

Figure 2:
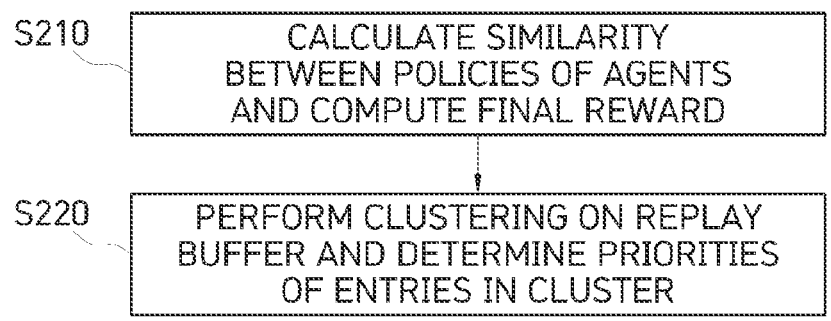

FIGS. 1 and 2 illustrate the operation of a method for exploration based on curiosity and prioritization of experience data in multi-agent RL according to an embodiment of the present invention.

As described above, the related art does not consider the influence on the action (policy) of another agent, but in multi-agent RL, the influence of another agent generating a complex environment generally plays a more important role.

According to an embodiment of the present invention, there is provided a technical feature of using the influence of another agent on the policy in the form of a reward.

According to an embodiment of the present invention, policies of different agents (the first agent and the second agent) are compared, and an additional reward (curiosity) is provided for policies having a high relationship with each other to perform more rapid and diverse learning.

The similarity of policies in two different agents is calculated through conditional mutual information as shown in Expression 1.

$$I(\pi_t^i(.|s_{i,t}); \pi_t^j(.|s_{j,t})|\pi_t^j-(.|s_{j,t}-)) \quad \text{[Expression 1]}$$

Expression 1 represents conditional mutual information of agents i and j, which are conditioned on a state $s_t-$, in a state $s_t$ ($s_t$ denotes state at time).

$\pi_t^i(.|s_{i,t})$ and $\pi_t^j(.|s_{j,t})$ denote the policies of agents i and j at time t.

In addition, $\pi_t^j-(.|s_{j,t}-)$ denotes the policy of agent j at time $t^-$.

The final reward in which the conditional mutual information is reflected is shown in Expression 2 below.

$$r_{i,t}^{new} = \quad \text{[Expression 2]}$$

$$r_t^{ext} + \delta \cdot \sum_{i,j\in[1,2,\ldots n], i\neq j} I\left(\pi_t^i(.\,|\,s_{i,t}); \pi_t^j(.\,|\,s_{j,t})\,\Big|\,\pi_t^j-(.\,|\,s_{j,t}-)\right)$$

Here, the final reward is $\mathcal{F}_{i,t}^{new}$, the reward given from the environment in common is $\mathcal{F}_t^{ext}$, and the reward $\Sigma_{i,j\in[1,2,\ldots n], i\neq j}I(\pi_t^i(.|s_{i,t}); \pi_t^j(.|s_{j,t})|\pi_t^j-(.|s_{j,t}-))$ according to the influence of the other agent is expressed as a product of a parameter S learned by the neural network.

According to an embodiment of the present invention, $\mathcal{F}_{i,t}^{cur}$ used as an intrinsic reward may be additionally used.

Referring to Expression 2, when the policies of the two agents are independent of each other (that is, when the policies do not influence each other), only the extrinsic reward given from the environment is used, and when the policies of the two agents are influenced by each other, an additional reward for more rapid and diverse learning of the influences on each other is used, thereby minimizing the uncertainty coming from other agents.

According to an embodiment of the present invention, a replay buffer is clustered and the priorities of entries within each cluster are determined.

In this case, the clustering includes clustering data having similar policies and extracting data from each cluster so that various cases are learned.

The priorities of entries in the cluster are learned such that samples that exert influence on agents having policies different from that of the agent in the cluster are used more to reflect the policies of other agents.

The first agent, while acting according to the policy thereof, monitors recent T histories (trajectory) of the second agent and calculates the similarity of the policies between the agents on the basis of the monitoring result.

In this case, the similarity is calculated using Kullback-Leibler (KL) divergence.

For Trajectory_T=(s0; a0; . . . ; sT; aT), the KL divergence between the agents i (the first agent) and j (the second agent) is calculated in Expression 3 below.

$$KL(\mathcal{P}_{\pi_{i,t}} || \mathcal{P}_{\pi_{j,t}}) = \sum_{(s_0, a_0, \ldots, s_T, a_T)} \mathcal{P}_{\pi_{i,t}}(s_0, a_0, \ldots, s_T, a_T) \quad \text{[Expression 3]}$$

$$\log \frac{\mathcal{P}_{\pi_{i,t}}(s_0, a_0, \ldots, s_T, a_T)}{\mathcal{P}_{\pi_{j,t}}(s_0, a_0, \ldots, s_T, a_T)}$$

In this case, a KL value for sample data may use the average value, the highest value, etc. of the agents, and the calculated KL values may be stored in the replay buffer in the form of ($S_{i,t}$, $a_{i,t}$, $r_{i,t}$+, KL).

Clustering may use an online algorithm. According to an embodiment of the present invention, hierarchical agglomerative clustering is used. That is, in the initial stage, each piece of data becomes a single cluster, and the clusters are continuously merged until the total number of clusters becomes smaller than a specific number of clusters.

For cluster merging, the KL value is used such that clusters of which the KL values have the smallest difference therebetween are preferentially merged, and when there are multiple pieces of data in a cluster, the average value of the distance is used.

When clustering is complete, a sampling value is calculated using each piece of data. The KL value of each sample data is converted into a sampling probability through Expression 4 below.

$$p = \frac{KL_i}{\sum_m KL_i} + \mu \quad \text{[Expression 4]}$$

In this case, m is the size of a cluster, and μ is a positive number greater than zero, which is a constant for allowing any data to be sampled. The calculated probability may be used directly, or importance sampling may be used to eliminate bias. The sampling probability Ψ is expressed as Expression 5.

$$\Psi_t = \left(\frac{1}{N} \cdot \frac{1}{\wp_t}\right)^\beta. \quad \text{[Expression 5]}$$

In this case, β is a parameter that controls sampling.

Selection of data in the replay buffer (memory) according to an embodiment of the present invention includes the following two operations.

First a cluster is selected, and data in the cluster is selected.

The cluster may be selected according to a round-robin method, and $KL_m/KL_{total}$ sampling is performed with a probability of m/N based on the number of pieces of data in the cluster, or based on the sum of KL values in the cluster.

Here, N is the total number of pieces of data, m is the number of pieces of data in the cluster, $KL_m$ is the sum of KL values in the cluster, and $KL_{total}$ is the sum of KL values in the entire memory.

Referring to FIG. 2, the method for exploration based on curiosity and prioritization of experience data in multi-agent RL according to an embodiment of the present invention includes: calculating the similarity between the policy of the first agent and the policy of the second agent, and computing the final reward using the similarity (S210); and performing clustering on a replay buffer using a result of calculating the similarity between the policy of the first agent and the policy of the second agent and performing sampling on data in the cluster (S220).

In operation S210, the similarity between the policies is calculated using conditional mutual information.

In operation S210, the final reward is computed by summing the product of a reward according to an influence of another agent and a parameter learned by the neural network and a reward given in common from an environment.

In operation S210, the final reward is additionally computed using an intrinsic reward.

In operation S220, an action according to the policy of the first agent is performed and a preset number of recent histories among histories of the second agent is monitored to calculate the similarity of the policies.

In operation S220, the similarity of the policies is calculated using KL divergence.

In operation S220, a value of the calculated KL divergence is stored in the replay buffer, and the clustering is performed such that a total number of the clusters become less than a preset number using hierarchical agglomerative clustering.

In operation S220, the sampling is performed according to at least one of a criterion using the number of all pieces of data and the number of pieces of data in the cluster and a criterion using the sum of the KL divergence values of the replay buffer and the KL divergence values in the cluster.

Figure 3A:
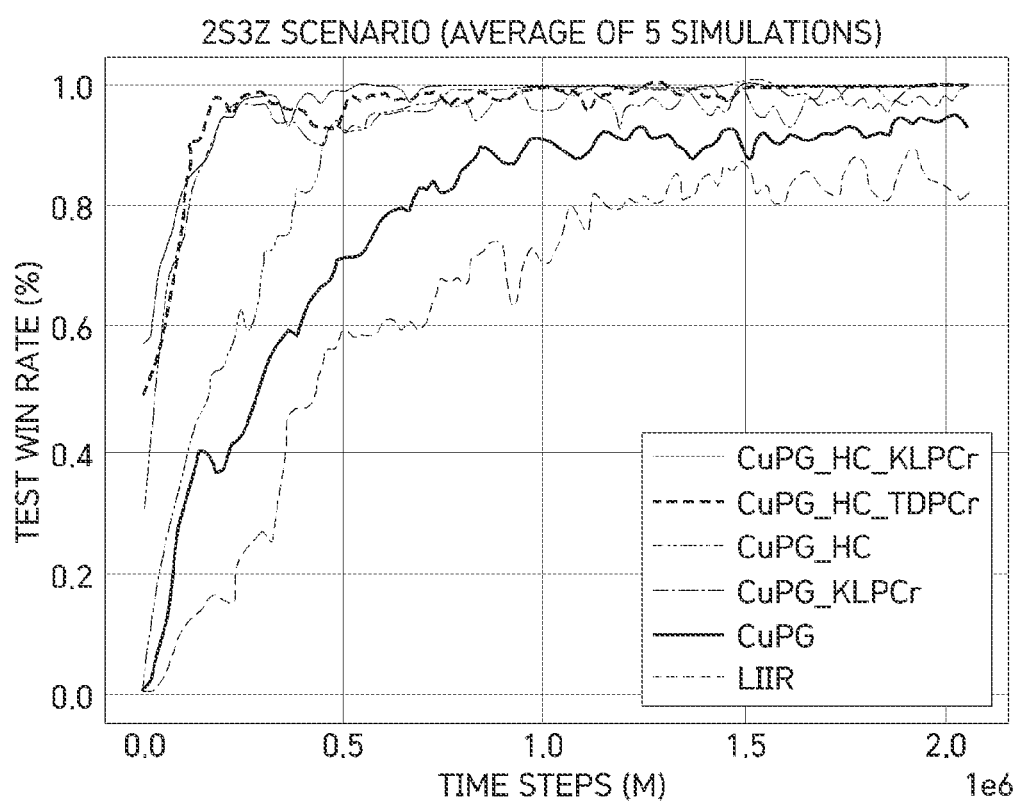
Figure 3B:
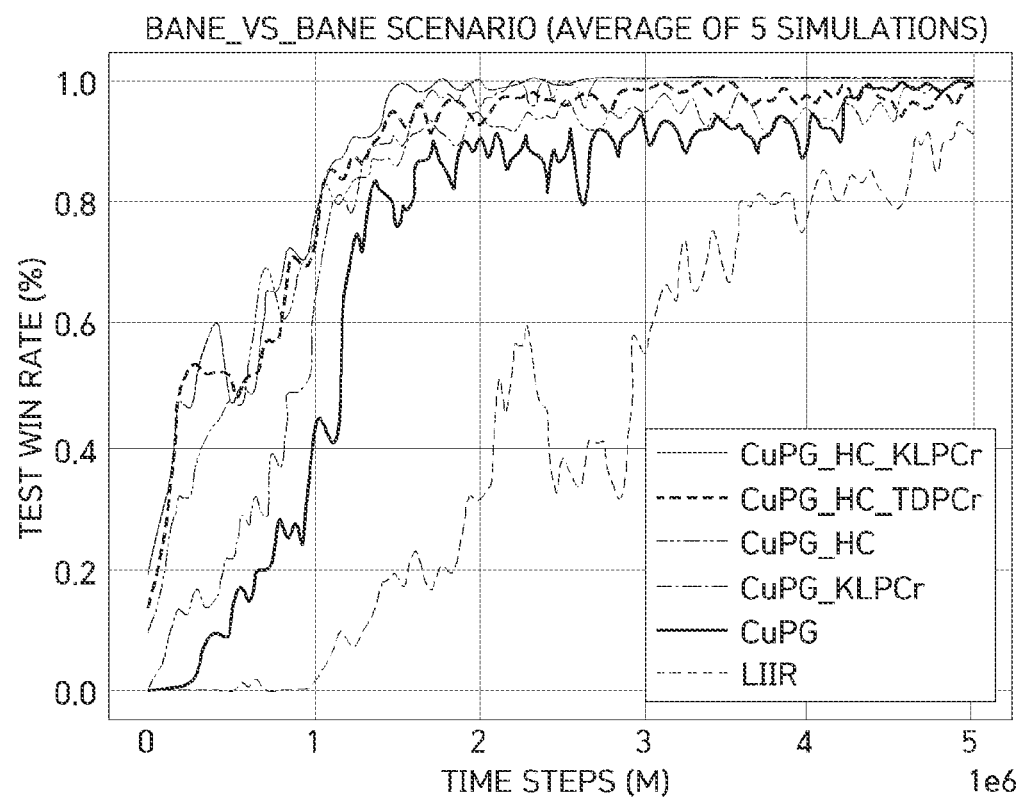

FIG. 3A through FIG. 3C illustrate test results according to the related art and an embodiment of the present invention.

In multi-agent RL according to the related art, an agent performs learning by reflecting the motivation thereof in learning, or by assuming the average action of other agents.

On the other hand, according to an embodiment of the present invention, the degree to which the policy of another agent influences the policy of the agent is quantified (conditional mutual information) so that learning is performed on the basis of an action having a great influence, thereby securing excellent learning performance in an environment in which the influence of other agents is great.

That is, the time required for learning is shortened, and learning results in a high probability of winning a game.

According to an embodiment of the present invention, the method is applicable even to data sampling of the replay buffer, thereby improving learning performance and allowing learning of various types of learning data using clustering.

The learning performance according to the embodiment of the present invention was confirmed using a Starcraft micromanagement environment.

In order to evaluate the performance, five experiments were performed for each scenario, and the average values were used as indexes.

FIGS. 3A, 3B, and 3C illustrate game winning rates after learning on an easy scenario (two Zealots and three Marines), a difficult scenario (twenty zerglings, four venoms), and a very difficult scenario (one medical ship, three predators, eight marines) and performing tests.

Referring to FIG. 3, CuPG_HC_KLPcr line is the result of using conditional mutual information-based learning and hierarchical agglomerative clustering for a replay buffer according to an embodiment of the present invention, the CUPG_HC_TDPCr line is the result of using conditional mutual information-based learning and the conventional TD Error-based replay buffer, and the CUPG_HC line is the result of using only conditional mutual information-based learning and a hierarchical agglomerative replay buffer (random selection within a cluster).

The CuPG_KLPCr line is the result of using only conditional mutual information-based learning and a KL divergence-based replay buffer prioritized policy, the CuPG line is the result of using only conditional mutual information-based learning, and the LIIR line is the result of using the LIIR according to the related art.

Referring to FIG. 3A through FIG. 3C, it can be seen that, in all experiments, the result according to the embodiment of the present invention exhibits the highest win rate and the highest learning rate.

Meanwhile, the method for exploration based on curiosity and prioritization of experience data in multi-agent RL according to the embodiment of the present invention may be implemented in a computer system or may be recorded on a recording medium. The computer system may include at least one processor, a memory, a user input device, a data communication bus, a user output device, and a storage. The above-described components perform data communication through the data communication bus.

The computer system may further include a network interface coupled to a network. The processor may be a central processing unit (CPU) or a semiconductor device for processing instructions stored in the memory and/or storage.

The memory and the storage may include various forms of volatile or nonvolatile media. For example, the memory may include a read only memory (ROM) or a random-access memory (RAM).

Accordingly, the method for exploration based on curiosity and prioritization of experience data in multi-agent RL according to the embodiment of the present invention may be implemented in a computer-executable form. When the method for exploration based on curiosity and prioritization of experience data in multi-agent RL according to the embodiment of the present invention is performed by the computer, instructions readable by the computer may perform the control method according to the present invention.

Meanwhile, the method for exploration based on curiosity and prioritization of experience data in multi-agent RL according to the present invention may be embodied as computer readable code on a computer-readable recording medium. The computer-readable recording medium is any recording medium that can store data that can be read by a computer system. Examples of the computer-readable recording medium include a ROM, a RAM, a magnetic tape, a magnetic disk, a flash memory, an optical data storage, and the like. In addition, the computer-readable recording medium may be distributed over network-connected computer systems so that computer readable code may be stored and executed in a distributed manner.

Figure 4:
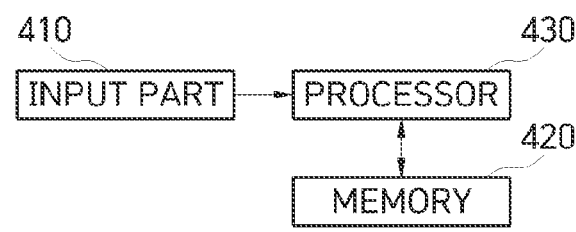
FIG. 4 illustrates an apparatus for curiosity-based exploration and prioritization of experience data in multi-agent reinforcement learning according to an embodiment of the present invention.

FIG. 4 illustrates an apparatus for curiosity-based exploration and prioritization of experience data in multi-agent RL according to an embodiment of the present invention.

The apparatus for curiosity-based exploration and prioritization of experience data in multi-agent RL according to the embodiment of the present invention includes an input unit 410 configured to receive the policy of the first agent and the policy of the second agent, a memory 420 in which a program for comparing the similarity of the policies to compute the final reward and determining the priority of experience data is stored, and a processor 430 configured to execute the program, and the processor 430 computes the final reward by summing a reward according to the influence of the second agent and the reward given in common from an environment on the basis of the similarity between the policies.

The processor 430 calculates the similarity between the policies through conditional mutual information and computes the final reward.

The processor 430 calculates the similarity between the policies using an action according to the policy of the first agent and a monitoring result of histories of the second agent.

The processor 430 performs clustering on a replay buffer using a result of calculating the similarity between the policies and performs sampling on data in the cluster to determine the priority of experience data.

The processor 430 performs the clustering such that the total number of the clusters become less than a preset number using hierarchical clustering.

The processor 430 performs the sampling according to at least one of a criterion using the number of all pieces of data and the number of pieces of data in the cluster and a criterion using the sum of K divergence values of the replay buffer and KL divergence values in the cluster.

As is apparent from the above, according to the present invention, the degree to which the policy of the second agent exerts an influence on the policy of the first agent is quantified, and learning is performed on the basis of an action having a great influence so that excellent learning performance can be secured in a multi-agent environment, and since the learning is applied to data sampling of a replay buffer, various types of learning data can be learned.

The effects of the present invention are not limited to those described above, and other effects not described above will be clearly understood by those skilled in the art from the above detailed description.

Meanwhile, the method for exploration based on curiosity and prioritization of experience data in multi-agent RL according to the embodiment of the present invention may be implemented in a computer system or may be recorded on a recording medium. The computer system may include at least one processor, a memory, a user input device, a data communication bus, a user output device, and a storage. The above-described components perform data communication through the data communication bus.

The computer system may further include a network interface coupled to a network. The processor may be a central processing unit (CPU) or a semiconductor device for processing instructions stored in the memory and/or storage.

The memory and the storage may include various forms of volatile or nonvolatile media. For example, the memory may include a read only memory (ROM) or a random-access memory (RAM).

Accordingly, the method for exploration based on curiosity and prioritization of experience data in multi-agent RL according to an embodiment of the present invention may be implemented in a computer-executable form. When the method for exploration based on curiosity and prioritization of experience data in multi-agent RL according to the embodiment of the present invention is performed by the computer, instructions readable by the computer may perform the control method according to the present invention.

Meanwhile, the method for exploration based on curiosity and prioritization of experience data in multi-agent RL according to the present invention may be embodied as computer readable code on a computer-readable recording medium. The computer-readable recording medium is any recording medium that can store data that can be read by a computer system. Examples of the computer-readable recording medium include a ROM, a RAM, a magnetic tape, a magnetic disk, a flash memory, an optical data storage, and the like. In addition, the computer-readable recording medium may be distributed over network-connected computer systems so that computer readable code may be stored and executed in a distributed manner.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A method for exploration based on curiosity and prioritization of experience data in multi-agent reinforcement learning, the method comprising the steps of:
    (a) calculating, by a processor, a similarity between a policy of a first agent and a policy of a second agent and computing a final reward using the similarity; and
    (b) performing, by the processor, clustering on a replay buffer using a result of calculating the similarity between the policy of the first agent and the policy of the second agent and performing sampling on data in the cluster,
    wherein the step (b) includes performing an action according to the policy of the first agent and monitoring a preset number of recent histories among histories of the second agent to calculate the similarity of the policies.

2. The method of claim 1, wherein the step (a) includes calculating the similarity between the policies using conditional mutual information.

3. The method of claim 1, wherein the step (a) includes summing a product of a reward according to an influence of another agent and a parameter learned by a neural network and a reward given in common from an environment to compute the final reward.

4. The method of claim 3, wherein the step (a) includes additionally using an intrinsic reward to compute the final reward.

5. The method of claim 1, wherein the step (b) includes using Kullback-Leibler (KL) divergence to calculate the similarity of the policies.

6. The method of claim 5, wherein the step (b) includes storing a value of the calculated KL divergence in the replay buffer and performing the clustering such that a total number of the clusters become less than a preset number using hierarchical agglomerative clustering.

7. The method of claim 6, wherein the step (b) includes performing the sampling according to at least one of a criterion using a number of all pieces of data and a number of pieces of data in the cluster and a criterion using a sum of the KL divergence values of the replay buffer and the KL divergence values in the cluster.

8. An apparatus for curiosity-based exploration and prioritization of experience data in multi-agent reinforcement learning, the apparatus comprising:
    an input unit configured to receive a policy of a first agent and a policy of a second agent;
    a memory in which a program for comparing a similarity of the policies to compute a final reward and determining a priority of experience data is stored; and
    a processor configured to execute the program,
    wherein the processor computes the final reward obtained by summing a reward according to an influence of the second agent and a reward given in common from an environment on the basis of the similarity between the policies,
    wherein the processor calculates the similarity between the policies using an action according to the policy of the first agent and a result of monitoring histories of the second agent.

9. The apparatus of claim 8, wherein the processor calculates the similarity between the policies through conditional mutual information and computes the final reward.

10. The apparatus of claim 8, wherein the processor performs clustering on a replay buffer using a result of calculating the similarity between the policies and performs sampling on data in the cluster to determine a priority of experience data.

11. The apparatus of claim 10, wherein the processor performs the clustering such that a total number of the clusters become less than a preset number using hierarchical agglomerative clustering.

12. The apparatus of claim 10, wherein the processor performs the sampling according to at least one of a criterion using a number of all pieces of data and a number of pieces of data in the cluster and a criterion using a sum of KL divergence values of the replay buffer and KL divergence values in the cluster.

* * * * *